June 24, 1969 G. R. LAURE 3,451,734
PLASTIC ROLLER
Filed Feb. 23, 1967

INVENTOR.
GEORGE R. LAURE
BY
Woodhams, Blanchard & Flynn
ATTORNEYS

United States Patent Office 3,451,734
Patented June 24, 1969

3,451,734
PLASTIC ROLLER
George R. Laure, Kalamazoo, Mich., assignor to The W-L Molding Company, Kalamazoo, Mich., a corporation of Michigan
Filed Feb. 23, 1967, Ser. No. 618,110
Int. Cl. F16c *13/00, 39/00, 35/00*
U.S. Cl. 308—15                                3 Claims

ABSTRACT OF THE DISCLOSURE

A plastics roller assembly for use on desk drawers and the like, said roller assembly comprising a wheel which is held in rotatable engagement with an axle. A locking pin extends centrally and axially through the axle for locking the axle into a position of use. In one form of the invention, said pin also holds the wheel in position on the axle.

Specification

This invention relates to a roller and to a stud for mounting said roller in a position of use and it relates particularly to such a roller and stud construction which are specifically designed for manufacturing entirely from a moldable synthetic organic plastics material.

For purposes of illustration the following disclosure of my invention is in terms of a specific embodiment, namely a drawer supported on said plastics rollers within a track attached to a desk, however, the broader aspects of my invention are not so limited.

Persons familiar with the manufacture and use of such equipment as metal desks, or similar, have long realized the need for an all plastics roller assembly for the support of drawers and the like. For example, in the past, persons producing roller assemblies, such as the one illustrated in my Patent No. 2,497,224, would themselves mold the parts which could be made of plastics, whereas, they were required to purchase those parts which had to be made of other material, such as metal. This resulted in various unnecessary expenses and problems. For example, an inventory of those metal parts had to be maintained which resulted in undesirable capital investment and warehousing expense. In addition, the inventory on hand had to be correlated with the outside source. Quality control of those parts produced by the outside source resulted in an additional burden and uncertainty. For these and other reasons, it has long been highly desirable that all parts be made of plastics. Although for some time portions such as the wheels of roller assemblies have been made of plastics, until now there has been no satisfactory method of constructing the entire roller assembly of plastics. There have been a number of suggested solutions but all have either been too complex in manufacture or too difficult to assemble.

Additionally, in the past a common problem has existed in that the side or face of the rollers would bind against the side of the rail whenever one side of the drawer was pulled a little faster or with a little more force than the other side. This would cause the drawer to stick and become difficult to open.

Thus, the objects of the invention include:

(1) To provide a roller assembly which may be molded entirely of plastics and yet be simple to manufacture and assemble.

(2) To provide a roller assembly, as aforesaid, which although it is simple in structure is also sturdy.

(3) To provide a plastics roller assembly, as aforesaid, which does not require use of metal parts.

(4) To provide a more economically produced roller assembly.

(5) To provide a roller assembly, as aforesaid, which is less likely to bind against the rail thereby making the drawer difficult to pull.

Other objects and advantages of the invention will become apparent from reading the following description and inspecting the attached drawings.

Figure 2:
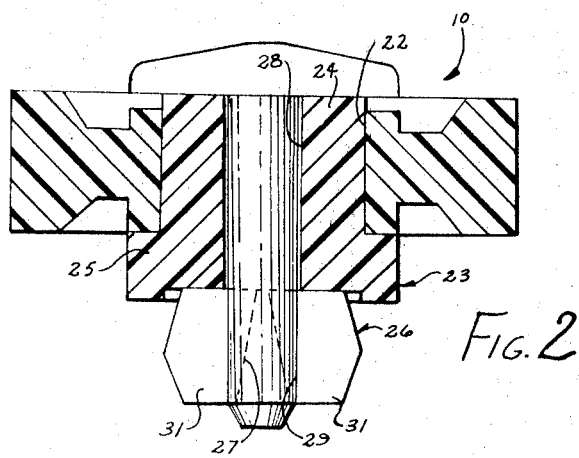
FIGURE 2 shows a sectional view of the invention taken along the lines II—II in FIGURE 1.

Certain terminology will be used in the following description for convenience in reference only and will not be limiting. The words "upwardly," "downwardly," "rightwardly," "leftwardly" and words of similar import will designate directions in the drawings to which reference is made.

General description

In general, the invention provides a roller assembly adapted for manufacture wholly from synthetic organic plastics material by large quantity, high speed, production means, such as injection molding. Such rollers are, for example, used to support a drawer, or the like, for horizontal movement along a track.

Figure 1:
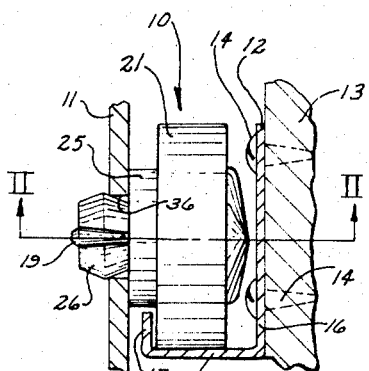
FIGURE 1 illustrates a preferred embodiment of the invention disposed in a rail or track.
Figure 3:
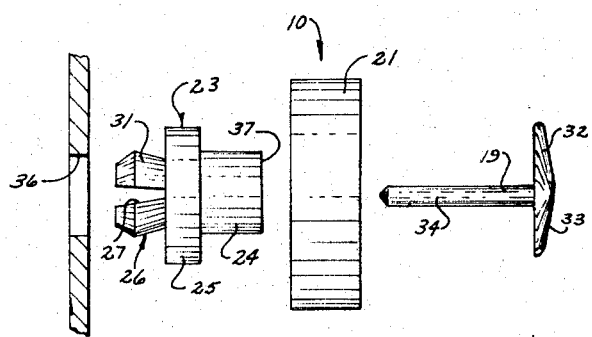
FIGURE 3 shows an exploded view of the plastics roller assembly.

Detailed description of FIGURES 1–3

The roller assembly 10, of which FIGURE 1 illustrates a preferred embodiment, is secured to the side wall 11 of a drawer or the like by means hereafter described. The side wall 11 has an opening 36 therein. The roller assembly 10 is mounted for movement along suitable guide means, which in the illustrated embodiment is a track or rail 12 which is secured to the frame 13 of an article, such as a desk, by conventional means, such as screws 14. Said desk and said drawer are of conventional type and may be made of wood and/or metal.

The rail 12 has an inner flange 16, a preferably shorter outer flange 17 and a web 18. Said rail 12 may be rolled or extruded, as desired, of a suitable material, such as plastics, aluminum, or steel. The inner flange 16 should be provided with holes at suitable locations through which screws 14 may extend for mounting.

The roller assembly 10 (FIGURE 3) is comprised of a locking pin 19, a wheel 21 and a mounting member 23. Wheel 21 (FIGURES 2 and 3) is provided with a bore or hole 22 through which will slip axle 24 of mounting member 23 for rotatably mounting said wheel. Flange 25 of mounting member 23 prevents leftward displacement of wheel 21 as well as limiting the leftward movement of roller assembly 10. Said mounting member 23 is provided on its leftward end with an expandable portion 26. The axle 24 and the flange 25 of mounting member 23 are provided with a hole 28 having one diameter and expandable portion 26 of mounting member 23, provided with a hole 29 having a somewhat smaller diameter. Said portion 26 additionally has a plurality of expandable slots 27 which are substantially parallel and which open radially from hole 29 forming between said slots a plurality of fingers 31. The locking pin 19 has a head 32, the outer surface 33 of which is convex, and a cylindrical portion 34. Said cylindrical portion 34 is of a constant diameter intermediate the diameters of hole 28 and hole 29 such that said portion will slip easily through hole 28 but must be driven through hole 29. Since the diameter of cylindrical portion 34 is greater than the diameter of hole 29, said portion forces fingers 31 radially thus causing portion 26 to grip the edge of hole 36 in the side wall 11. Preferably the axle 24, the locking pin 19 and the wheel are molded of a plastic, for example nylon. If desired, the axle 24 and the locking pin 19 can be made of one type of plastic, for example, Delrin, and the wheel can be molded of a second plastic, for example, nylon.

The roller assembly 10 (FIGURE 3) may be mounted upon drawer 11 by inserting expandable portion 26 leftwardly through hole 36 in drawer 11, said portion will be contracted slightly as it passes through said hole. Wheel 21 is next mounted upon axle 24 and locking pin 19 is then inserted through hole 28 and forced through hole 29, the latter causing portion 26 to expand slightly becoming securely locked against the periphery of hole 36. Pin 19 is finally driven leftwardly until the inner surface of head 32 rests against the facing surface 37 of member 23. When in operation if the drawer should become moved or twisted sidewards, the outermost point of the convex surface 33 will contact flange 16 and will hold wheel 21 spaced from said flange.

*Modifications*

Figure 4:
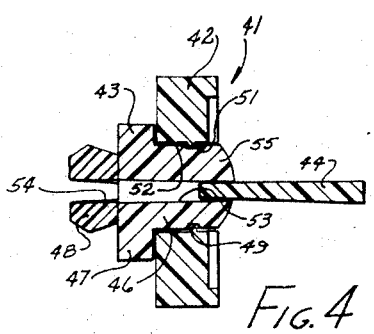
FIGURE 4 shows a modification of the invention.
Figure 5:
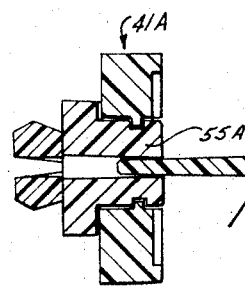
FIGURE 5 shows another modification.

Modified roller assemblies 41 and 41A (FIGURES 4 and 5) illustrate embodiments which can be commercialized as a single unit for instant mounting. The modified roller assembly 41 (FIGURE 4) is comprised of a wheel 42, a mounting member 43 and a cylindrical rod or pin 44. The mounting member 43 is similar to mounting member 23 having an axle portion 46, a flange 47 and an expandable portion 48. In addition, however, mounting member 43 is provided with a circumferential groove 49 of any desirable cross-sectional shape, such as square. Wheel 42 is substantially similar to wheel 21, however, having a ridge 51 extending inwardly from the surface of that portion of wheel 42 which defines hole 52. Ridge 51 is provided for engagement in groove 49, said ridge 51 being sufficiently resilient as to allow wheel 42 to be snapped into position on axle portion 46, yet sufficiently rigid as to prevent accidental disengagement of wheel 42 from axle portion 46. In the center of the rightward portion of mounting member 43 is defined a hole 53 having one diameter and the leftward portion of mounting member 43 has defined in the center thereof a hole 54 having a diameter less than the diameter of hole 53. The cylindrical rod 44 has a constant diameter which is substantially equal to or enough greater than, the diameter of hole 53 such that when said rod is inserted in hole 53 it will be frictionally retained therein. The rod 44 thus radially reinforces the axle and assists the axle in resisting radial deformations which might tend to loosen the snap connection between the wheel and axle. The roller assembly 41 if molded in three parts, can be completely assembled prior to marketing by snapping wheel 42 into place around axle portion 46 and cylindrical rod 44 may be inserted into hole 53 and retained therein by friction. The roller assembly 41 to be mounted need only have expandable portion 48 inserted into an appropriate hole similar to FIGURE 3 and the end of rod 44 tapped sufficiently to drive said rod through hole 54 thereby expanding portion 48 and securely mounting said roller assembly. Axle portion, or stud, 43 in this embodiment is provided with a portion 55 projecting beyond the nearest plane of the roller 42. Said portion 55 thus functions as a bumper in the same manner as above described for the head 33. Where such bumper is not desired, the end 55A of the stud 43 can be made coplanar with the wheel 42, as illustrated in FIGURE 5.

Although the above-mentioned drawings and description apply to one particular, preferred embodiment of the invention, it is not my intention to eliminate other variations or modifications which do not depart from the scope of the invention unless it is specifically stated to the contrary in the hereinafter appended claims.

The embodiments of the invention in which an exclusive property or privilege is claimed are defined as follows:

1. In a plastics roller assembly secured to a first member and mounted in an aperture therein for supporting said first member for friction-free lateral movement with respect to a second member, the combination comprising:
an elongated axle having a cylindrical bearing surface at one end and a plurality of circumferentially spaced, axially extending, radially flexible projections at the other end, said projections being receivable in said aperture in said first member, said bearing surface and said projections being separated by a radially outwardly projecting flange;
means defining an opening in the center of said radially flexible projections and means defining an extension of said opening, said extension of said opening extending through the remaining length of said axle;
an elongated pin having a peripheral dimension at least greater than the size of said opening, said pin being receivable in said extension of said opening and extending substantially through the length of said axle, said pin having a length sufficient to urge said radially flexible projections radially outwardly into engagement with the peripheral portion of said aperture to thereby fixedly secure said axle to said first member;
means defining a wheel having a central opening therein, said wheel having a width at least equal to substantially the length of said bearing surface and said central opening receiving said bearing surface of said axle for rotatably supporting said wheel means relative to said axle; and
radial overlapping means positively retaining said wheel means on said axle, said overlapping means being axially spaced from said radially projecting flange on said axle by a distance not substantially greater than the thickness of said wheel means to limit axial spacing between said wheel means and said first member, said pin substantially radially filling said extension of said opening and at least assisting in preventing said wheel from sliding off said axle.

2. The roller assembly defined in claim 1, wherein said elongated pin has a length equal to at least the length of said elongated axle and said radially overlapping means comprises an enlarged head on one end of said pin having a size greater than the diameter of said bearing surface on said axle for radially overlapping an axial face of said wheel means, said pin being receivable in said extension of said opening at said one end of said axle and occupying all of said opening to urge said radially flexible projection radially outwardly, said enlarged head being located closely adjacent said one end of said axle, said wheel means being retained on said bearing surface between said flange and said enlarged head.

3. The roller assembly defined in claim 1, wherein said radially overlapping means is comprised by one of said bearing surface and said central opening in said wheel means having a circumferential groove therein and the other of said bearing surface and said central opening having a radially projecting annular rib thereon, said rib being received into said groove for retaining said wheel means on said bearing surface of said axle and permitting said wheel means to rotate relative to said axle.

References Cited

UNITED STATES PATENTS

| | | | |
|---|---|---|---|
| 2,497,224 | 2/1950 | Laure | 308—15 |
| 2,724,867 | 11/1955 | Smith | 308—15 X |
| 2,850,333 | 9/1958 | Hamman | 308—6 |
| 3,042,961 | 7/1962 | Tieri | 85—83 X |
| 3,099,501 | 7/1963 | Hillson et al. | 308—3.8 |
| 3,107,947 | 10/1963 | Hulterstrum | 308—238 X |
| 3,116,528 | 1/1964 | Poe | 85—84 |
| 3,164,418 | 1/1965 | Biesecker | 308—3.8 |
| 3,215,476 | 11/1965 | Jacobs | 308—3.8 |

(Other references on following page)

UNITED STATES PATENTS

| | | | |
|---|---|---|---|
| 3,301,610 | 1/1967 | Packett et al. | 308—3.8 |
| 3,361,489 | 1/1968 | Gionet | 308—3.8 |

FOREIGN PATENTS

| | | |
|---|---|---|
| 86,778 | 5/1896 | Germany. |
| 316,069 | 7/1929 | Great Britain. |
| 562,444 | 7/1944 | Great Britain. |
| 886,118 | 1/1962 | Great Britain. |
| 1,030,952 | 5/1966 | Great Britain. |
| 1,345,005 | 10/1963 | France. |
| 1,373,541 | 8/1964 | France. |
| 1,373,580 | 8/1964 | France. |

EVERETTE A. POWELL, Jr., *Primary Examiner.*

F. SUSKO, *Assistant Examiner.*